United States Patent
Toyoda et al.

(10) Patent No.: US 7,201,932 B2
(45) Date of Patent: Apr. 10, 2007

(54) METHOD FOR PRODUCING MEAT PRODUCTS AND PROCESSED MEAT PRODUCTS COATED WITH CURDLAN GEL FILM

(75) Inventors: Satoshi Toyoda, Tokyo (JP); Masahiro Kimura, Tokyo (JP)

(73) Assignees: Organo Corporation, Tokyo (JP); Takeda-Kirin Foods Corporation, Tokyo (JP)

( * ) Notice: Subject to any disclaimer, the term of this patent is extended or adjusted under 35 U.S.C. 154(b) by 555 days.

(21) Appl. No.: 10/618,685

(22) Filed: Jul. 15, 2003

(65) Prior Publication Data

US 2004/0047949 A1    Mar. 11, 2004

(30) Foreign Application Priority Data

Jul. 30, 2002 (JP) .............................. 2002-221110

(51) Int. Cl.
*A23L 1/314* (2006.01)

(52) U.S. Cl. ...................... 426/302; 426/641; 426/646

(58) Field of Classification Search ................ 426/641, 426/646, 302
See application file for complete search history.

(56) References Cited

U.S. PATENT DOCUMENTS 4,946,700 A * 8/1990 Taguchi et al. ............. 426/520
5,688,775 A    11/1997 Renn et al.

FOREIGN PATENT DOCUMENTS

| EP | 0 328 317 | | 8/1989 |
| EP | 0 487 340 | | 5/1992 |
| EP | 0 584 948 | | 3/1994 |
| JP | 03172145 | * | 7/1991 |
| JP | 09238653 A | * | 9/1997 |
| WO | 0 157 092 | | 8/2001 |

OTHER PUBLICATIONS

Patent Abstracts of Japan; vol. 015, No. 413, Oct. 22, 1991, JP 03 172145 A, Takeda Chem. Ind. Ltd.) Jul. 25, 1991.

* cited by examiner

*Primary Examiner*—Arthur L. Corbin
(74) *Attorney, Agent, or Firm*—Manabu Kanesaka

(57) ABSTRACT

A meat product or a processed meat product coated with a film of curdlan gel is prepared.

1 Claim, No Drawings

METHOD FOR PRODUCING MEAT PRODUCTS AND PROCESSED MEAT PRODUCTS COATED WITH CURDLAN GEL FILM

BACKGROUND OF THE INVENTION

1. Field of the Invention

The present invention relates to a method for producing meat products and processed meat products coated with a film of curdlan gel.

2. Description of the Related Art

In some of the traditional methods of enhancing the formability of processed meat products, cured meat or processed meat products are stuffed in edible casings made from natural intestine or collagen, while in other methods, cured meat or processed meat products are first stuffed in inedible casings, such as cellulose, fibrous, or vinylidene chloride casings, are heat-treated, and are then stripped off the casings to form skinless products. In one method, a sausage emulsion is coated with a collagen paste using a double nozzle.

Unlike the inedible casings, such as cellulose, fibrous, or vinylidene chloride casings, which must be disposed of and thus produce significant amounts of waste, natural intestine or collagen casings are edible and thus produce less waste. Nonetheless, the growing concern among consumers about animal diseases, such as scrapie, bovine spongiform encephalopathy (BSE), and foot and mouth disease, has brought about a need for casings for processed meat products that are not made from guts of sheep, cows, pigs, and other livestock animals.

SUMMARY OF THE INVENTION

Accordingly, it is an objective of the present invention to provide meat products or processed meat products coated with safe edible casings that do not cause diseases or allergies and do not produce large amounts of waste.

In an effort to find a way to achieve this objective, the present inventors have made an extensive study and, as a result, found that, by applying an alkaline aqueous solution of curdlan to the weakly acidic surface of meat products or processed meat products, a thin film of curdlan gel is formed over the surface of the meat products as a result of neutralization. The present inventors have also found that, subsequent to the application of the curdlan solution, the surface of the meat products or processed meat products can be exposed either to an aqueous solution of an alkali metal salt or an alkaline earth metal salt or to an neutralizing acid to form a more durable film of curdlan gel that has a strength sufficient for practical use. These findings ultimately led the present inventors to devise the present invention.

Accordingly, a first invention concerns a meat product or a processed meat product coated with a film of curdlan gel.

A second invention concerns a method for producing a meat product or a processed meat product coated with a film of curdlan gel. This method involves applying an alkaline aqueous solution of curdlan to a meat product or a processed meat product, and subsequently exposing the meat product or the processed meat product to an aqueous solution of an alkali metal salt or an alkaline earth metal salt to form a film of curdlan gel.

A third invention concerns another method for producing a meat product or a processed meat product coated with a film of curdlan gel. This method involves applying an alkaline aqueous solution of curdlan to a meat product or a processed meat product, and subsequently exposing the meat or the processed meat product to an acid for neutralization to form a film of curdlan gel.

A fourth invention concerns still another method for producing a meat product or a processed meat product coated with a film of curdlan gel. This method involves applying an alkaline aqueous solution of curdlan to a meat product or a processed meat product, exposing the meat product or the processed meat product to an aqueous solution of an alkali metal salt or an alkaline earth metal salt, and further exposing the meat product or the processed meat product to an acid for neutralization to form a film of curdlan gel.

DETAILED DESCRIPTION OF THE INVENTION

When an alkaline aqueous solution of curdlan is applied to the weakly acidic surface of a meat product or a processed meat product, which has a pH of 5.5 to 6.5, the solution is neutralized at the surface, forming a gel film. The resulting film, however, is a relatively thin film with a limited thickness since the alkaline curdlan solution is neutralized only in the vicinity of the contact surface.

The finding of the present inventors has proven that, following the application of the alkaline aqueous solution of curdlan, the surface of the meat product can be exposed either to an aqueous solution of an alkali metal salt or an alkaline earth metal salt or to a neutralizing acid to provide the curdlan gel film with a practical strength. This discovery enabled the present inventors to devise the present invention.

Examples of the meat product to which the curdlan gel film can be applied according to the present invention include pork, beef, horse flesh, mutton, poultry meat, and the like. Examples of the processed meat product include sausage, ham, salami, and the like.

The alkaline aqueous solution of curdlan for forming the edible curdlan gel film may be any alkaline aqueous solution in which curdlan has been dissolved.

Curdlan for use in the present invention is a water-insoluble thermogelling polysaccharide that gels upon heating and consists mostly of beta-(1,3)-linked glucose residues. Curdlan is produced by bacteria of Alcaligenes and Agrobacterium species, more specifically, by *Alcaligenes faecalis* var. myxogenes 10C3K strain [*Agricultural Biological Chemistry* 30, 196 (1966)], NTK-u (IFO13140), which is a mutant strain of *Alcaligenes faecalis* var. *myxogenes* 10C3K strain, and *Agrobacterium radiobactor* (IFO13127) and its mutant strain U-19 (IFO13126).

While the alkaline aqueous solution of curdlan for use in the present invention may be any alkaline aqueous solution in which curdlan has been dissolved, alkalis such as sodium carbonate, potassium carbonate, sodium hydroxide, potassium hydroxide, and potassium triphosphate are preferably used for the purpose of dissolving curdlan.

While the alkaline aqueous solution of curdlan may be prepared by any suitable method, it is preferably prepared by, for example, mixing a dispersion of curdlan with an aqueous solution of an alkali to dissolve curdlan. The alkaline aqueous solution may, for example, contain 0.04 to 6 wt % of alkali and may have a pH of 11 or above although the solution may contain the alkali at any concentration. The concentration of curdlan in the alkaline aqueous solution of curdlan is typically from 0.5 to 15 wt %, preferably from 1.5 to 5 wt %. If the concentration of curdlan in the alkaline aqueous solution is lower than 0.5 wt %, then the resulting film will have an insufficient strength. Conversely, the concentration of curdlan higher than 15 wt % results in too high a viscosity of the solution. This makes the defoamtion, a process essential for continuous production of the products of the invention, difficult.

In making the edible casings in the form of curdlan gel film, the above-described alkaline aqueous solution of curdlan is first applied to the surface of the meat product or the processed meat product. This is preferably done by a brush, by spraying, by dipping in a bath of the above-described alkaline aqueous solution of curdlan, or by a double nozzle, although other means or techniques may also be used.

When the alkaline aqueous solution of curdlan comes in contact with the meat product or the processed meat product, a neutralization reaction takes place between the weakly acidic surface of the meat product and, as a result, the solution is neutralized in the proximity of the contact surface to form a thin film of curdlan gel.

If necessary, excess alkali aqueous solution of curdlan remaining on the surface of the meat product or the processed meat product is removed by, for example, shaking, and the still remaining alkaline aqueous solution of curdlan is exposed either to an aqueous solution of alkali metal or alkaline earth metal or to an acidic aqueous solution. In this manner, a complete film of curdlan gel can be formed.

While the exact mechanism by which the alkaline aqueous solution of curdlan applied to the meat product or the processed meat product forms a curdlan gel film upon exposure to the aqueous solution of alkali metal or alkaline earth metal still remains unclear, it is believed that the cationic components of the dissociated metal salts act on curdlan as a crosslinking agent to form crosslinks through ionic bonds, thus causing gelling of the solution.

Examples of such alkali metal salts or alkaline earth metal salts include sodium chloride, sodium sulfate, sodium bromide, calcium chloride, and calcium lactate. These metal salts should generally be contained in the aqueous solution at a concentration of 10 wt % to saturation and, preferably, at a concentration of 20 wt % to saturation, although the metal salts may be contained at any concentration.

Examples of the acid used for neutralizing the alkaline aqueous solution of curdlan include aqueous solutions of inorganic acids, such as hydrochloric acid and sulfuric acid, and aqueous solutions of organic acids, such as lactic acid and citric acid. The concentration of the aqueous acid solution should generally be in the range of 0.01 to 10 wt % and preferably in the range of 0.1 to 5 wt %, while the acid solution may be used at any concentration.

While the exposure to the aqueous solution of the alkali metal salt or the alkaline earth metal salt or to the aqueous acid solution may be carried out by any suitable technique, it is preferably done by coating with a brush, by spraying, by dipping (immersion) in a bath of the aqueous solution of the alkali metal or the alkaline earth metal, or by dipping in a bath of the aqueous acid solution.

Alternatively, the exposure of the meat product or the processed meat product with the alkaline aqueous solution of curdlan applied thereto to the aqueous solution of the alkali metal salt or the alkaline earth metal salt may be followed by neutralization of the surface with the above-described acid to form a film of curdlan gel.

The resulting gel is then heat-treated at 70 to 125° C. to make the gel thermoirreversible. This treatment increases the strength of the gel and at the same time imparts to the casing a texture similar to that of natural intestine.

EXAMPLES

Example 1

Using an ordinary technique, a sausage emulsion with the ingredient composition shown in Table 1 was prepared. The emulsion was extruded from a home-size stuffer and was dipped in an alkaline aqueous solution of curdlan (alkali=potassium triphosphate; alkali concentration=1 wt %, pH=11.5, curdlan concentration=3 wt %) to apply the solution. After removing the excess alkali aqueous solution of curdlan by shaking, the extruded emulsion was dipped in a 25% aqueous salt solution to form a film of curdlan gel, followed by washing with tap water. Subsequently, the coated emulsion was dried in a smoke house (80° C.) for 30 minutes and was smoked for another 30 minutes (80° C.)

TABLE 1

| Ingredients | Proportions (Wt %) | Weights (g) |
| --- | --- | --- |
| Ground pork ham | 55.80 | 837.0 |
| Ground pork fat | 18.00 | 270.0 |
| Ice water | 18.00 | 270.0 |
| Phosphate agent | 0.40 | 6.0 |
| Salt | 1.30 | 19.5 |
| Sugar | 1.30 | 19.5 |
| Seasonings | 1.70 | 25.5 |
| Casein Na | 1.50 | 22.5 |
| Potato starch | 2.00 | 30.0 |
| Total | 100.00 | 1500.0 |

Example 2

Using an ordinary technique, a sausage emulsion with the ingredient composition shown in Table 1 was prepared. The emulsion was extruded from a home-size stuffer and was dipped in an alkaline aqueous solution of curdlan (alkali=potassium triphosphate; alkali concentration=1 wt %, curdlan concentration=3 wt %) to apply the solution. After removing the excess alkali aqueous solution of curdlan by shaking, the extruded emulsion was dipped in an aqueous solution of calcium lactate (5 wt %) to form a film of curdlan gel, followed by washing with tap water. Subsequently, the coated emulsion was dried in a smoke house (80° C.) for 30 minutes and was smoked for another 30 minutes (80° C.).

Example 3

Using an ordinary technique, a sausage emulsion with the ingredient composition shown in Table 1 was prepared. The emulsion was extruded from a home-size stuffer and was dipped in an alkaline aqueous solution of curdlan (alkali=potassium triphosphate; alkali concentration=1 wt %, pH=11.5, curdlan concentration=3 wt %) to apply the solution. After removing the excess alkali aqueous solution of curdlan by shaking, the extruded emulsion was dipped in a 1 wt % aqueous solution of lactic acid to form a film of curdlan gel, which was followed by washing with tap water. Subsequently, the coated emulsion was dried in a smoke house (80° C.) for 30 minutes and was smoked for another 30 minutes (80° C.).

Example 4

Using an ordinary technique, a sausage emulsion with the ingredient composition shown in Table 1 was prepared.

Using a double nozzle with a distance between the outer and the inner nozzles of 0.5 mm, the emulsion and an alkaline aqueous solution of curdlan (alkali=potassium triphosphate; alkali concentration=1 wt %, curdlan concentration=3 wt %) were coextruded, with the emulsion extruded from the inner nozzle and the curdlan solution from the outer nozzle, to coat the surface of the sausage emulsion with the curdlan solution. The extruded emulsion was then dipped in a 25% aqueous salt solution and then in a 1 wt % aqueous solution of lactic acid to form a film of curdlan gel. This was followed by washing with tap water. Subsequently, the coated emulsion was dried in a smoke house (80° C.) for 30 minutes and was smoked for another 30 minutes (80° C.).

The sausages obtained in Examples 1 through 4 each proved to be coated with an edible casing that has a texture similar to that of natural intestine. Thus, each sausage proved to be of high quality.

As set forth, the present invention provides meat products or processed meat products coated with an edible casing of curdlan gel, which is a disease- and allergy-free material and does not produce large amounts of waste. The present invention also provides a simple way to produce such meat products.

The meat products or the processed meat products coated with curdlan gel in accordance with the present invention has a texture similar to that of conventional meat products, which requires the use of natural intestine. Not utilizing guts of sheep, cows, pigs and other livestock animals as a material for casings, the meat products or the processed meat products of the present invention do not pose the problem of diseases caused by eating body parts of even-toed ungulates, nor do these products give rise to the problem of allergies.

What is claimed is:

1. A method for producing a meat product or processed meat product, comprising the steps of:
    preparing the meat product or processed meat product,
    applying an alkaline aqueous solution of curdlan onto the meat product or processed meat product to form a film of curdlan gel on the meat product or processed meat product, and then
    applying onto the meat product or processed meat product, having the film of curdlan gel thereon, an aqueous solution of any one of an alkali metal salt, an alkaline earth metal salt and an acid to complete the film of curdlan gel.

* * * * *